No. 796,992. PATENTED AUG. 15, 1905.
C. H. FISHER & F. A. RAYMOND.
SHIPPING SYSTEM.
APPLICATION FILED NOV. 4, 1904.

2 SHEETS—SHEET 1.

Fig. 1.

| FROM | TO | CLASSIFICATION | RATE IN CENTS PER 100 POUNDS | | | | | | SPECIAL OR COMMODITY | RATE | FREIGHT LINE | MINIMUM CHARGE | MAXIMUM EXPRESS WEIGHT | EXPRESS RATE PER CWT. GRADUATED TABLE PAGE— |
|---|---|---|---|---|---|---|---|---|---|---|---|---|---|---|
| | | | First Class | Second Class | Third Class Rule 25 | Fourth Class Rule 26 | Fifth Class | Sixth Class | Articles | C.L. / L.C.L. | | | | |
| | | 0 | 75 | 65 | 55 | 50 | 40 | 35 | 30 | 25 | | | | A |
| Ansonia | Chicago | | | | | | | | | Apples | 70 | Star Union | .75 | 3 lbs | 3.00 |
| New Haven | Atlanta | | | | | | | | | | 53 37 | G.S. Line | 1.22 | | |

Witnesses
J. P. Dijon
Florence N. Monk

Inventors
Charles H. Fisher
and
Frank A. Raymond
by Gingell Hall
their Attorneys

ANDREW B. GRAHAM CO., PHOTO-LITHOGRAPHERS, WASHINGTON, D. C.

No. 796,992.　　　　　　　　　　　　　　　　　PATENTED AUG. 15, 1905.
C. H. FISHER & F. A. RAYMOND.
SHIPPING SYSTEM.
APPLICATION FILED NOV. 4, 1904.

2 SHEETS—SHEET 2.

| ARTICLES | CLASSIFICATIONS | | | | | | | | | EXCEPTIONS |
|---|---|---|---|---|---|---|---|---|---|---|
| | OFFICIAL CLASS | | SOUTHERN CLASS | | WESTERN CLASS | | WESTERN-TEX-TRF CLASS | | | |
| | L.C.L. | C.L. | L.C.L. | C.L. | L.C.L. | C.L. | L.C.L. | C.L. | | |
| HARDWARE | 3 | 3 | 2 | 2 | 2 | 2 | 2 | 2 | | |

FIG. 2.

Witnesses
J. P. Dijou
Florence H. Wash

Inventors
Charles H. Fisher
and
Frank A. Raymond
by George E. Hall
their Attorney

ANDREW. B. GRAHAM CO., PHOTO-LITHOGRAPHERS. WASHINGTON, D. C.

UNITED STATES PATENT OFFICE.

CHARLES H. FISHER AND FRANK A. RAYMOND, OF NEW HAVEN, CONNECTICUT.

SHIPPING SYSTEM.

No. 796,992. Specification of Letters Patent. Patented Aug. 15, 1905.

Application filed November 4, 1904. Serial No. 231,335.

*To all whom it may concern:*

Be it known that we, CHARLES H. FISHER and FRANK A. RAYMOND, citizens of the United States, residing at New Haven, in the county of New Haven and State of Connecticut, have invented certain new and useful Improvements in Shipping Systems, of which the following is a specification, reference being had therein to the accompanying drawings.

Our invention relates to a useful shipping system; and its object, among other things, is to produce a system whereby the several freight tariffs, classifications, &c., may be compiled for ready reference.

To these and other ends our invention consists in the shipping system hereinafter set forth.

Referring to the drawings, Figure 1 is an illustration of the rate-sheet, and Fig. 2 an illustration of the classification-sheet.

In the practice of our invention it is preferable to have the rate and classification sheets bound into book form with a letter-tag attached for alphabetical arrangement; but this is not essential, as the sheets may be held separably in a card or other similar system.

At present the information concerning tariffs, rates, classifications, &c., is contained in a great number of books, circulars, pamphlets, &c.; and it is the principal object of our invention to simplify and unify such information so that all data required by a shipper on both his outbound and inbound freight may be compiled and condensed for ready reference. By this system and by the compilation of the necessary information any clerk will be able to secure the desired information concerning shipments, and it will not be necessary to depend upon a special clerk who has secured the information by experience. Our system is also very advantageous in auditing freight bills, as any clerk in the office can audit the bills without special information concerning the shipping branch of the business.

The charges for freight transportation and routings for same are governed by various classifications and tariffs, also by various special or commodity lists which name a specific rate to apply on the commodity. Throughout the United States the classifications more commonly used are four in number—to wit, official, southern, western, and western (as adopted for Texas traffic.)

To illustrate the use of the rate-sheet in connection with articles subject to classifications, we will say, for example, that we are to ship hardware from Ansonia to Chicago. In the column headed "From" we insert "Ansonia," and "Chicago" in the column "To." By reference to the rate-sheet it is observed that Chicago is governed by the official classification designated by the letter "O," which is placed in the column headed "Classification." Then we ascertain from the classification-sheet under the index-letter "H" that hardware is shipped subject to a third-class rate and by referring to "Chicago" on the rate-sheet that the third-class rate per one hundred pounds is fifty cents, and if minimum charge is desired the same will be seventy-five cents, inserted in the column headed "Minimum charge." We then place the name of the line by which the goods will be shipped—for illustration, say, the "Star Union"—in the column headed "Freight line."

If the articles are subject to special or commodity rates, insert the article in subcolumn headed "Article" (upon the rate-sheet) and then insert the rates in "L. C. L." and "C. L." columns opposite the point to which you are shipping.

To illustrate the use of the rate-sheet for special or commodity articles, we will take, for example, the article "apples," New Haven to Atlanta, Georgia. Insert "apples" in the column headed "Article," and in "C. L." column insert "37," which is the rate on same, and in "L. C. L." column insert "53," which is the rate for less than car lots. Minimum charge should be inserted in minimum-charge column. After this information is once compiled it then remains a permanent record. From this rate-sheet it is determined at a glance, and without reference to a great number of tariffs, classifications, &c., all information necessary for shipping to and from given points. So far as we are aware no means have been heretofore provided whereby this information may be readily secured from a single source. By means of the letter-index (shown in Fig. 1) all shipping-points and articles can be readily referred to, thus enhancing its use for reference.

Referring to Fig. 2, which is the classification-sheet, we first place the name of the article in the column headed "Article," and for purposes of illustration we will use "hardware." We then examine the several classification-sheets and find that under official classification hardware for less than car lots is shipped at a third-class rate and the same for car lots. We therefore place the numeral "3" in the columns designated "L. C. L." and "C. L." upon the classification-sheet, Fig. 2. Under southern, western, and western Texas tariff classifications the same article is shipped as second class. We therefore place the numeral "2" in the several columns under these several classifications. On these classification-sheets, which are also arranged alphabetically, the shipper would place the name of the articles forwarded by him and will compile the information from all of the numerous sources above referred to.

For express shipments, in the column headed "Maximum express weights" will be placed the greatest weight which can be forwarded by express for an amount equal to but not exceeding the minimum freight charge, which will enable the shipper to decide immediately whether to forward by express or freight at the lowest possible cost. In the next column, headed "Express rate," &c., will be placed the rate per one hundred pounds by express to the given point, and by referring to a graduated-rate table, conveniently arranged, the shipper can ascertain the charges on packages of any weight for any point required.

There are many minor changes and alterations that can be made within our invention, and we would therefore have it understood that we do not limit ourselves to the exact form herein shown, but claim all that falls fairly within the spirit and scope of our invention.

Having described our invention, what we claim as new, and desire to secure by Letters Patent, is—

In a shipping system; a rate-sheet, having a plurality of columns thereon, the said columns being severally headed as follows: "From," "To," "Classification," "Freight line," "Minimum charge," "Maximum express weight," "Express rate per cwt.," a subdivided column headed "Rate in cents per 100 pounds," said subdivided columns being designated, "First class," "Second class," "Third class," "Fourth class," "Fifth class," "Sixth class," "Rule 25" and "Rule 26," a column designated, "Special or commodity rate," and subdivided into columns headed, "Articles," "L. C. L.," and "C. L.," and a classification-sheet, having a column thereon designated "Articles;" a plurality of columns headed "Classifications," said plurality of columns being subdivided into columns designated "Official," "Southern," "Western," "Western-Tex. traf.," which are again subdivided into columns designated "L. C. L." and "C. L.," substantially as described.

In testimony whereof we affix our signatures in presence of two witnesses.

CHARLES H. FISHER.
FRANK A. RAYMOND.

Witnesses:
GEORGE E. HALL,
JESSIE E. THOMAS.